| United States Patent [19] | [11] Patent Number: 4,791,022 |
|---|---|
| Graham | [45] Date of Patent: Dec. 13, 1988 |

[54] DECORATIVE PANELS

[75] Inventor: W. David Graham, Heath, Ohio

[73] Assignee: Owens-Corning Fiberglas Corporation, Toledo, Ohio

[21] Appl. No.: 684,175

[22] Filed: Dec. 21, 1984

Related U.S. Application Data

[63] Continuation of Ser. No. 549,049, Nov. 7, 1983, abandoned.

[51] Int. Cl.$^4$ .................... B32B 5/16; B32B 19/00
[52] U.S. Cl. ..................... 428/324; 427/202; 427/203; 427/204; 427/205; 428/325; 428/483
[58] Field of Search ............... 427/202, 203, 204, 205; 428/324, 325, 483

[56]  References Cited

U.S. PATENT DOCUMENTS

| 3,008,205 | 11/1961 | Blaies | 22/193 |
|---|---|---|---|
| 3,145,438 | 8/1964 | Kottke et al. | 22/193 |
| 3,312,650 | 4/1967 | Case et al. | 260/29.3 |
| 3,549,404 | 12/1970 | Liberti | 427/203 X |
| 3,577,257 | 5/1971 | Hutzler | 427/204 X |
| 3,639,654 | 2/1972 | Robins | 260/37 R |
| 3,734,936 | 5/1973 | Brown et al. | 260/395 B |
| 3,822,226 | 7/1974 | Taft et al. | 260/18 TN |
| 3,836,491 | 9/1974 | Taft et al. | 260/20 TN |
| 3,879,339 | 4/1975 | Richard | 260/38 |
| 3,886,021 | 5/1975 | Breckenfelder | 427/203 X |
| 3,899,612 | 8/1975 | Emblem | 427/202 X |
| 3,917,558 | 11/1975 | Gardikes et al. | 260/38 |
| 4,017,461 | 4/1977 | Dunlop et al. | 260/67 R |
| 4,033,925 | 7/1977 | Anderson | 260/42.53 |
| 4,083,817 | 4/1978 | Anderson | 260/38 |
| 4,108,826 | 8/1978 | Anderson et al. | 260/395 B |
| 4,175,067 | 11/1979 | Kottke et al. | 260/30.4 R |
| 4,215,206 | 7/1980 | Hanesworth et al. | 525/441 |
| 4,311,627 | 1/1982 | Hutchings | 260/30.4 R |
| 4,320,043 | 3/1982 | Anderson | 523/144 |
| 4,366,193 | 12/1982 | Linden | 427/340 |
| 4,371,648 | 2/1983 | Gardikes et al. | 523/144 |
| 4,405,657 | 9/1983 | Miller | 427/203 X |
| 4,516,996 | 5/1985 | Willard et al. | 427/341 |

FOREIGN PATENT DOCUMENTS 2066714  7/1981  United Kingdom .

OTHER PUBLICATIONS

"Furan Polymers"–Polymer Science and Technology, vol. 7, (1967), (pp. 432–445).
"New Cold Box Process is Developed", Langer et al., Foundry M & T, Feb. 1982, (pp. 63–69).
"Furan Derivatives", Kirk–Othmer–Encyclopedia of Chemical Technology, vol. II, 3rd Ed., John Wiley & Sons, N.Y., (1980), pp. 507–527.

Primary Examiner—Shrive Beck
Attorney, Agent, or Firm—Patrick P. Pacella

[57]  ABSTRACT

A method and composite produced by depositing particulate material on a planular surface, contacting the surface and the particulate material with a gas-curable resin and curing the resin to adhere the particulate matter to the surface.

29 Claims, No Drawings

DECORATIVE PANELS

This application is a continuation of application Ser. No. 549,049, filed 11/7/83, now abandoned.

This invention relates to the production of decorative panels such as ceiling board, wall board, and the like.

In one of its more specific aspects, this invention relates to a method and the production of random, high profile board.

BACKGROUND OF THE INVENTION

The production of decorative panels is well known. Generally, there is formed a substrate of fiberboard, glass fibers, glass wool or the like over which there is placed one, or more, finishing coats. Usually such substrates are of sufficient composition, stiffness and strength that they are self-supporting over their width. Any of a number of individual materials, or combination of materials, can be deposited on the surface, adhered there by adhesive and have a finish applied thereover.

The limitations involved with such methods are that they subsequently require costly and time-consuming procedures for drying the finished product. The method of this invention is directed to the solution of that problem.

STATEMENT OF THE INVENTION

According to this invention, there is provided a method of producing a board having a decorative surface comprising a high profile facing which comprises depositing a particulate material on a planular surface, coating the particulate material and the planular surface with a gaseous curable resin and contacting the coated surface with a gaseous curing agent to cure the curable resin and adhere the particulate material to the planular surface.

In a preferred embodiment of the invention, the planular surface is fiber glass board, the particulate material is mineral, the curable resin is furfuryl alcohol or an oligomeric acrylate and the curing agent is gaseous sulfur dioxide.

DETAILED DESCRIPTION OF THE INVENTION

The method of this invention is applicable to the production of any decorative surfaces including those used for wall board, ceiling board and decorative panels. The unprocessed boards can be of any desired thickness, whether or not self-supporting and, preferably, will have one substantially smooth surface on which the particulate material is deposited.

The particulate material can be of any suitable size, shape and density such that the cured resin can hold the particulate material to the surface of the board in whatever position the board is placed. The particulate material can include sand, gravel, marble, glass, mica and the like, of mineral or non-mineral character, such as wood chips, and the like, and mixtures thereof. In general, the particles can be within the size of from about 40 mesh to about ¼" in diameter, or a mixture thereof.

The particles can be distributed on the substrate board in any suitable manner, in random or orderly arrangement, over any portion of the substrate. The particles can be retained in their initial position as deposited or can be arranged thereafter by vibrating the substrate or by a brushing action which distributes the particles into any desired pattern.

The particles can be coated at any time. They can be pre-coated and deposited on the planular surface thereafter or, they can be coated after deposition thereon, or both.

The particles can be coated in any manner, including dipping, spraying, and the like. Similarly, they can be coated to any extent, that is, to provide partial or complete coverage of the particle. In any instance, they will be coated to an extent sufficient to provide adherence between the particles and the substrate. Or, should it be desired that a second deposition of particles be superimposed over, or between, the particles of the first deposition, sufficient resin can be applied in one, or more, applications to provide therefore.

Any gaseous curable resin can be employed. Such resins can be comprised of systems such as an acid curing resin system, with or without a pigment, such as furfuryl alcohol or an oligometric acrylate and sulfur dioxide curing gas; and a resin component and hardener such as a furan resin and a ring-substituted aralkyl or alkyl hydroperoxide, or urea formaldehydes, phenol-formaldehydes or furan copolymers, in conjunction with a hydroperoxide and their corresponding curing gases including, sulfur dioxide, hydrogen chloride, and sulfur trioxide.

The curing gas can be introduced into contact with the gaseous curable resin in any suitable manner. Preferably, the gaseous contact will be made within a substantially leak-proof chamber as the substrate, with the particulate matter and curable resin positioned thereon, is passed through in continuous fashion.

The resin is maintained in contact with the gaseous curing agent for a time sufficient to cure the resin. This period of time is usually from about 5 seconds to about 30 seconds, after which the substrate, with the particulate matter adhering thereto, can be subjected to further processing such as, for example, trimming, sub-dividing, waterproofing, painting, and the like.

It will be evident from the foregoing that various modifications can be made to this invention. Such, however, are considered as being within the scope of the invention.

I claim:

1. A method of producing a decorative surface having a high profile facing which comprises depositing a particulate material on a planular surface of a fiberglass wall or ceiling board, positioning a gas-curable resin consisting of furfuryl alcohol or an oligomeric acrylate in contact with the surface and the particulate material and contacting the resin with a gaseous curing agent to cure the resin and adhere said particulate material to said surface.

2. The method of claim 1 in which said planular surface comprises fiber glass board, said particulate material is mineral, and said curing agent is gaseous sulfur dioxide.

3. The method of claim 1 in which said planular surface is self-supporting and has a substantially smooth surface.

4. The method of claim 1 in which said particulate material is selected from the group consisting of sand, gravel, marble, glass, mica and wood chips.

5. The method of claim 1 in which said particulate material is positioned on said substrate and rearranged after said positioning.

6. The method of claim 1 in which said particulate material is pre-coated prior to said depositing.

7. The method of claim 1 in which said particulate material is coated after said depositing.

8. The method of claim 1 in which said curable resin is contacted with said gaseous curing agent as said surface, having the particulate material and resin thereon, is moved through a chamber.

9. The composite produced by the method of claim 1.

10. The method of claim 1 in which said particulate material is mineral.

11. The method of claim 1 in which said curing agent is gaseous sulfur dioxide.

12. A method of producing a decorative surface having a high profile facing which comprises depositing a particulate material on a planular surface of a fiberglass wall board or ceiling board, positioning an acid gas-curable resin in contact with the surface and the particulate material and contacting the resin with an acid gaseous curing agent to cure the resin and adhere said particulate material to said surface.

13. The method of claim 12 in which said acid gaseous curing agent is selected from the group consisting of sulfur dioxide, hydrogen chloride and sulfur trioxide.

14. The method of claim 12 in which said acid gas-curable resin is selected from the group consisting of a urea formaldehyde, a phenol-formaldehyde and a furan copolymer and said acid gaseous curing agent is selected from the group consisting of sulfur dioxide, hydrogen chloride and sulfur trioxide.

15. The method of claim 12 wherein said particulate material is selected from the group consisting of sand, gravel, marble, glass, mica and wood chips.

16. The method of claim 12 in which said particulate material is positioned on said substrate and rearranged after said positioning.

17. The method of claim 12 in which said particulate material is pre-coated prior to said depositing.

18. The method of claim 12 in which said particulate material is coated after said depositing.

19. The method of claim 12 in which said curable resin is contacted with said gaseous curing agent as said surface, having the particulate material and resin thereon, is moved through a member.

20. A method of producing a decorative surface having a high profile facing which comprises depositing a particulate material on a planular surface of a fiberglass wall board or ceiling board, positioning an acid gas-curable resin and a hardener in contact with the surface and the particulate material and contacting the resin with an acid gaseous curing agent to cure the resin and adhere said particulate material to said surface.

21. The method of claim 20 in which said acid gaseous curing agent is selected from the group consisting of sulfur dioxide, hydrogen chloride and sulfur trioxide.

22. The method of claim 20 in which said acid gas-curable resin consists of a furan resin, said hardener consists of a ring-substituted aralkyl or alkyl hydroperoxide and said acid gaseous curing agent is selected from the group consisting of sulfur dioxide, hydrogen chloride and sulfur trioxide.

23. The method of claim 20 in which said acid gas-curable resin is selected from the group consisting of a urea formaldehyde, a phenol-formaldehyde and a furan copolymer; said hardener consists of a hydroperoxide and said acid gaseous curing agent is selected from the group consisting of sulfur dioxide, hydrogen chloride and sulfur trioxide.

24. The method of claim 20 in which said particulate material is selected from the group consisting of sand, gravel, marble, glass, mica and wood chips.

25. The method of claim 20 in which said particulate material is positioned on said substrate and rearranged after said positioning.

26. The method of claim 20 in which said particulate material is pre-coated prior to said depositing.

27. The method of claim 20 in which said particulate material is coated after said depositing.

28. The method of claim 20 in which said curable resin is contacted with said gaseous curing agent as said surface, having the particulate material and resin thereon, is moved through a chamber.

29. The composite produced by the method of claim 20.

* * * * *